(12) United States Patent
Goldenberg et al.

(10) Patent No.: US 6,347,259 B1
(45) Date of Patent: Feb. 12, 2002

(54) HIGH PRECISION POSITIONING DEVICE AND METHOD OF OPERATING SAME

(75) Inventors: Andrew A. Goldenberg, Toronto; Nenad Kircanski, North York, both of (CA); Prakash Naidu, Bangalore (ID)

(73) Assignee: Virtek Vision International Inc., Waterloo (CA)

(*) Notice: Subject to any disclaimer, the term of this patent is extended or adjusted under 35 U.S.C. 154(b) by 0 days.

(21) Appl. No.: 09/283,150

(22) Filed: Apr. 1, 1999

(51) Int. Cl.[7] ................................................. G06F 7/00
(52) U.S. Cl. ..................................... 700/218; 700/213
(58) Field of Search ................................. 700/218, 213

(56) References Cited

U.S. PATENT DOCUMENTS

| | | |
|---|---|---|
| 4,260,941 A | 4/1981 | Engelberger et al. |
| 4,571,149 A | 2/1986 | Soroka et al. |
| 4,586,546 A | 5/1986 | Mezei et al. |

(List continued on next page.)

FOREIGN PATENT DOCUMENTS

| | | |
|---|---|---|
| DE | 3043474 | 7/1982 |
| DE | 3805808 | 9/1989 |
| EP | 0588236 | 3/1994 |
| WO | 9535505 | 12/1995 |

OTHER PUBLICATIONS

Jean Owen, High Velocity at Dearborn Engine, May 1997.*
Modern Equipment, High Velocity Traveling Column CNC Center, Jan. 1998.*
Mike Lynch, CNC Tech Talk: A reminder about Parameters, Jul. 1998.*
Mike Lynch, CNC Tech Talk: How Fast Can You Feed, Jun. 1998.*
University of Pennsylvania, The Basics of Computer Numeric Control; Key Concept Number one.*
Mike Lynch, CNC Tech Talk: Which is Faster, G00 or G01, Mar. 1999.*
Mills et al., *Robotic Manipulator Impedance Control of Generalized Contact Force and Positrion*, Nov. 1991.*
Lee et al., *Generalized Impedance Manipulators: Its Application to Force and Position Control*, 1991.*

(List continued on next page.)

*Primary Examiner*—Christopher P. Ellis
*Assistant Examiner*—Gene O. Crawford
(74) *Attorney, Agent, or Firm*—Nancy E. Hill; Hill & Schumacher (57) ABSTRACT

A high precision positioning device includes an end effector and a platen spaced therebelow for receiving a workpiece. One of the end effector and the platen is moveable in the X-Y plane. One of the end effector and the platen is moveable in the Z direction. The device includes senors for sensing the position of the end effector in the X, Y and Z directions relative to the platen. The apparatus includes a control system for controlling the movement of the end effector relative to the platen and adjusting the position of the end effector relative to the X. Y and Z position as sensed by the sensors. Preferably the platen is generally parallel to the X-Y plane and the Z direction is normal to the platen. Preferably the control system uses a position, velocity and acceleration control system for controlling the movement in the X and Y direction and an impedance control system for controlling the movement in the Z direction. The method of operating the high precision positioning device uses a host computer and an embedded computer. The method includes the steps of receiving and checking data; sending and decoding the checked data and determining when a move command appears; instructing a move command and determining set-point data for the move command; sending set-point data to regulator task module and sending data from the positional sensors to the regulator task module; determining the control parameters in the regulator task module and activating the motors to move the end effector.

17 Claims, 10 Drawing Sheets

U.S. PATENT DOCUMENTS

| | | | |
|---|---|---|---|
| 4,714,400 A | | 12/1987 | Barnett et al. |
| 5,010,492 A | * | 4/1991 | Kurakake et al. ...... 364/474.29 |
| 5,206,568 A | * | 4/1993 | Bjornson et al. ........ 318/568.1 |
| 5,239,476 A | * | 8/1993 | James et al. ........... 364/474.01 |
| 5,261,768 A | * | 11/1993 | Loucks et al. ................. 409/80 |
| 5,306,510 A | * | 4/1994 | Meltzer ........................ 422/65 |
| 5,443,792 A | * | 8/1995 | Buhler ........................ 422/67 |
| 5,505,003 A | * | 4/1996 | Evans et al. .................. 29/430 |
| 5,507,410 A | * | 4/1996 | Clark et al. ................. 221/171 |
| 5,559,413 A | | 9/1996 | Seto |
| 5,744,305 A | | 4/1998 | Fodor et al. |
| 5,807,522 A | | 9/1998 | Brown et al. |
| 5,808,893 A | * | 9/1998 | Pugh et al. ............ 364/474.35 |
| 5,836,068 A | * | 11/1998 | Bullen et al. .............. 33/501.7 |
| 5,900,171 A | * | 5/1999 | Karube et al. ......... 219/121.79 |
| 5,963,007 A | * | 10/1999 | Toyozawa et al. .......... 318/799 |
| 6,060,854 A | * | 5/2000 | Yutkowitz ................... 318/632 |
| 6,093,989 A | * | 7/2000 | Joffe ......................... 310/90.5 |

OTHER PUBLICATIONS

Chan, S.P. et al. "Generalized Impedance Control of Robot for Assembly Tasks Requiring Compliant Manipulation" IEEE Transactions on Industrial Electronics, US, IEEE INC. New York, vol. 43, No. 4 Aug. 1, 1996 pp. 453–461.

"Simplifying Gantry Control With Linear Motors" Machine Design, US, Penton, Inc. Cleveland, vol. 60., No. 20, Sep. 8, 1988 pp. 99–102.

* cited by examiner

HIGH PRECISION POSITIONING DEVICE AND METHOD OF OPERATING SAME

FIELD OF THE INVENTION

This invention is related to a high precision positioning device and a method of operating that may be used in a number of applications and is of particular use with regard to high precision, high density dispensing.

BACKGROUND OF THE INVENTION

As our ability to analyse smaller and smaller material improves the need for machines that can accurately and repeatably dispense such material increases. In particular there is a need to produce gene arrays accurately and repeatably. A high precision positioning device may be used as a high precision, high density dispensing apparatus. High precision positioning device could be used for a number of applications but it is of particular importance with regard to the production of gene arrays. Accordingly, the following discussion will be framed with regard to gene arrays but such apparatus could be used for any high precision task.

A gene array is a small glass slide on which different DNA samples, in a range of up to 200,000 unique samples, are spotted as an array. The materials used for the samples may range from yeast DNA to human DNA. Preferably the spots are as close as possible so as to facilitate scanning by a suitable microscope reader. The gene array provides the ability to analyze thousands of genes simultaneously so as to speed-read the book of a live being. The arrays are typically used in the diagnosis and treatment of diseases such as cancer. However, as bio-sensors and gene maps, there are a wide range of possible applications in a variety of fields, such as police records, identity cards, agriculture and the like. In addition the apparatus could be used for such applications as microelectronic manufacturing and rapid prototyping.

Typically a gene array requires a very large number, 2,000 to 200,000, of DNA samples to be spotted on a small area, approximately 20 mm×20 mm. For a typical 6,000 samples or a 78×78 array of different DNA samples, the centre-to-centre distance between adjacent samples is approximately 0.25 mm and the sample diameter is less than 0.20 mm. Similarly, for a typical 150,000 samples or a 388×388 array of different DNA samples, the centre-to-centre distance between adjacent samples is approximately 0.05 mm and the sample diameter is less than 0.04 mm.

Preferably the samples are of similar and uniform shape and size so that there is a useful readable image. The quantity of DNA per sample should also be within a close tolerance range (5 nano litres or less depending on the spot diameter). Gene arrays are expensive products and accordingly, the tolerance for error is very stringent.

There are a number of factors which determine the effectiveness of a system for manufacturing gene arrays. Specifically, the precision of the apparatus or robot, the flexibility with regard to the configuration of the dispensing and spotting, and the ability to accommodate various sizes and layouts of source plates are examples of factors that determine effectiveness. The precision of the spotting is very important in regard to the usefulness of the gene array. One factor influencing the precision of spotting is the precision of the robotic system manipulating the dispenser in the three-dimensional space. Further, the configuration of the layouts of samples required for different applications varies widely and an effective system would be able to accommodate various sample layouts. Similarly, the sizes and layouts of DNA source plates mounted near the slide holder platen in the robotic workspace also vary and an effective system would be able to accommodate various sizes and layouts of source plates.

Currently, there are a number of manufacturers that are working on developing gene array production systems. Generally, these gene array systems are automated, but they have no intelligent features to support high-quality dispensing processes or any on-line inspection and monitoring. Further, these systems lack flexibility in terms of sample and slide layouts, and adoption of different dispenser heads for different specific needs. Moreover such systems are limited to low density arrays (up to 10,000 samples). As well, none of these systems includes a representation of the spotting process as a real-time animation. Clearly, this feature allows the user to visualize the progress of production since the minute samples being made on the slides cannot be seen by the naked eye.

Some manufacturers have focussed on the print head designs. For example, Telechem International Inc. has produced a micro-spotting print head called ArrayIt™ which allows the user to use between one and thirty-two pins. The Genetic Microsystems Inc. has a spotting system that includes a ring rod and a pin that move independently in the z direction. The ring rod picks up the sample which is held by surface tension. The ring rod is then positioned in the desired x-y location. The pin is driven down through the ring rod, picks up the sample, contacts the slide and deposits the sample o n the slide.

Accordingly it would be advantageous to provide a high precision positioning device and method of operating same that could be used with a dispensing head for manufacturing gene arrays and the like and in addition that could be used with other the end effectors. It would be advantageous to provide a dispensing method and apparatus that is flexible and adaptable to meet a variety of productivity requirements required for reliable gene array production.

Further it would be desirable that the dispensing method and apparatus can be adapted to accommodate different dispensing heads. In addition, it would be advantageous to provide a system that provides a representation of the spotting process as a real-time animation. Still further, it would be advantageous to provide a system that includes on-line inspection and monitoring.

SUMMARY OF THE INVENTION

A high precision positioning device includes an end effector and a platen spaced therebelow for receiving a workpiece. One of the end effector and the platen is moveable in the X-Y plane. One of the end effector and the platen is moveable in the Z direction. The device includes senors for sensing the position of the end effector in the X, Y and Z directions relative to the platen. The apparatus includes a control system for controlling the movement of the end effector relative to the platen and adjusting the position of the end effector relative to the X. Y and Z position as sensed by the sensors. Preferably the platen is generally parallel to the X-Y plane and the Z direction is normal to the platen. Preferably the control system uses a position, velocity and acceleration control system for controlling the movement in the X and Y direction and an impedance control system for controlling the movement in the Z direction.

In another aspect of the invention a method of operating a high precision positioning device is provided. The method uses a host computer and an embedded computer. The method includes the steps of receiving and checking data;

sending and decoding the checked data and determining when a move command appears; instructing a move command and determining set-point data for the move command; sending set-point data to regulator task module and sending data from the positional sensors to the regulator task module; determining the control parameters in the regulator task module and activating the motors to move the end effector.

In a further aspect of the invention a capillary reel dispenser for use in association with a high precision positioning device is provided. The capillary reel dispenser includes a capillary tube, a capillary reel having the capillary tube wound therearound, a means for advancing the capillary tube and a cutter for cutting off the used portion of the capillary tube.

In a still further aspect of the invention a slide having a plurality of gene material spotted thereon in a density of at least 20,000 spots per centimetre squared is provided.

Further features of the invention will be described or will become apparent in the course of the following detailed description.

BRIEF DESCRIPTION OF THE DRAWINGS

The invention will now be described by way of example only, with reference to the accompanying drawings, in which.

DETAILED DESCRIPTION OF THE INVENTION

The high precision positioning device of the present invention includes an apparatus component and a software component which are discussed below. The high precision positioning device of the present invention could be used for a number of applications. It could be used as a dispensing apparatus for producing gene arrays. The high precision positioning device and a method for using same of the present invention is described in the context of manufacturing gene arrays and specifically DNA arrays. However, it will be appreciated by those skilled in the art that this high precision, high density dispensing apparatus could be used for a number of applications. Specifically any type of end effector could be used in place of the dispensing head (described below). For example the end effector could be a cutting laser to perform high precision cutting. Alternatively the end effector could be a dispenser which deposits chemicals for high precision, high density chemical etching. Accordingly any type of end effector could be used in place of the dispenser head described below.

APPARATUS

Figure 1:
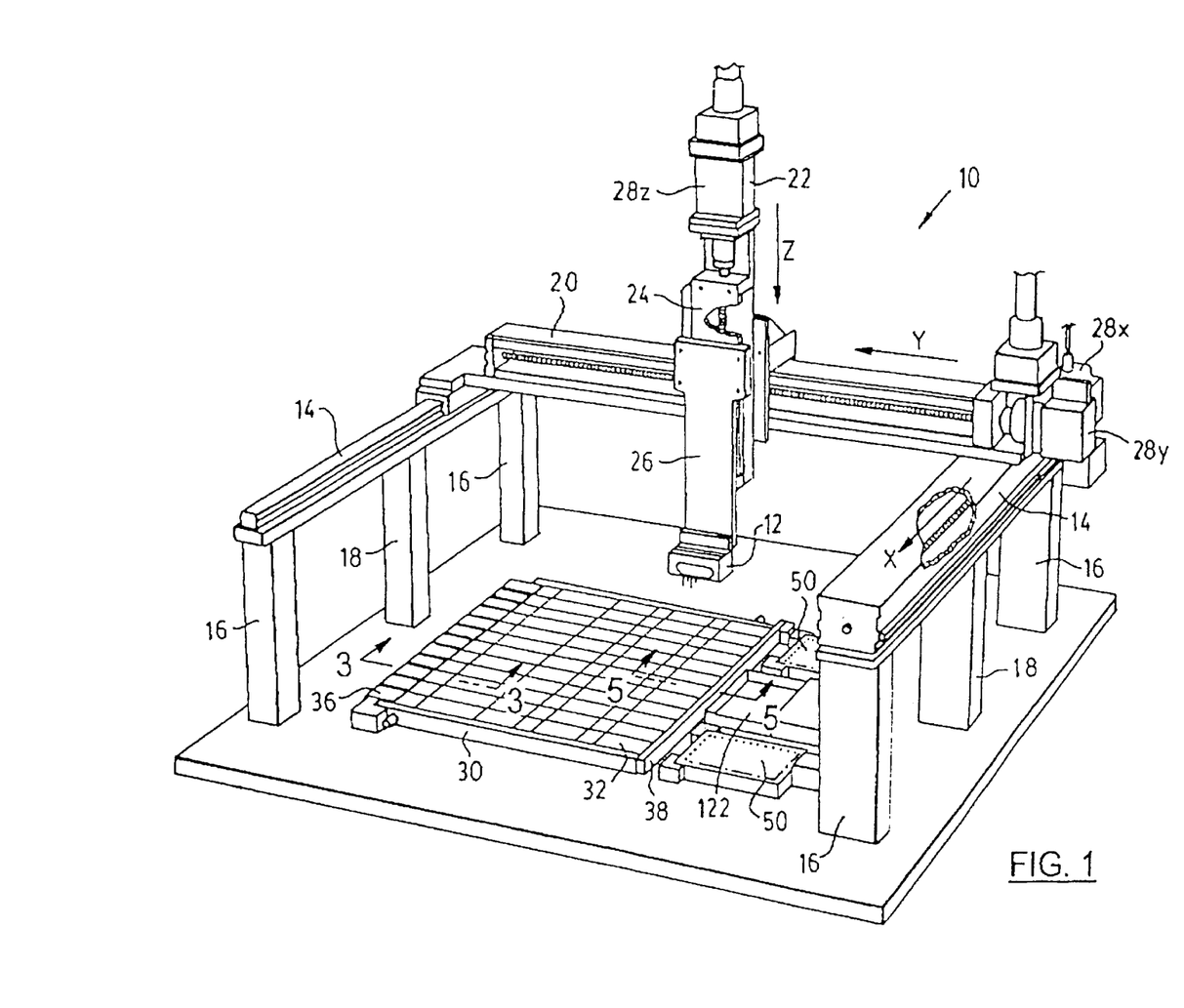
FIG. 1 is a perspective view of the dispensing apparatus of the present invention.
Figure 1A:
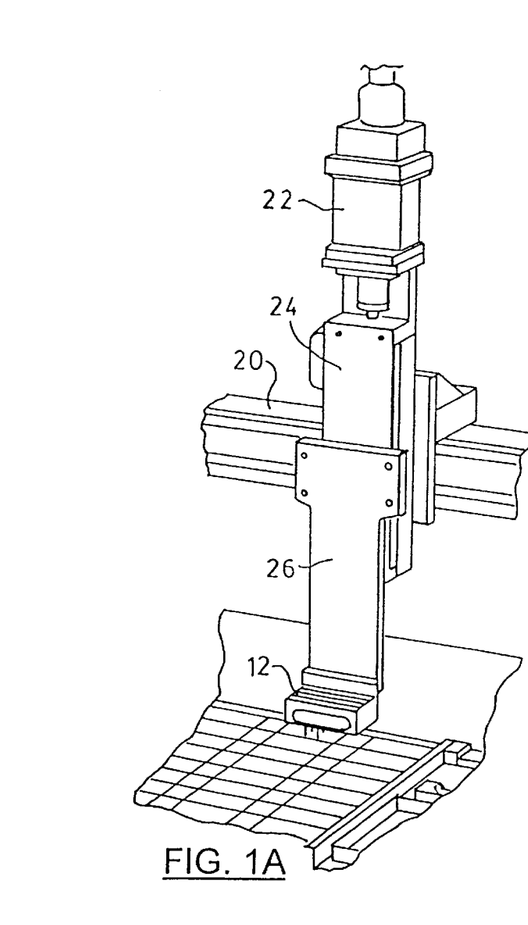
FIG. 1a is a partial perspective view of the dispensing apparatus of the present invention similar to FIG. 1 but showing the dispensing head in the fully descended position.
Figure 2:
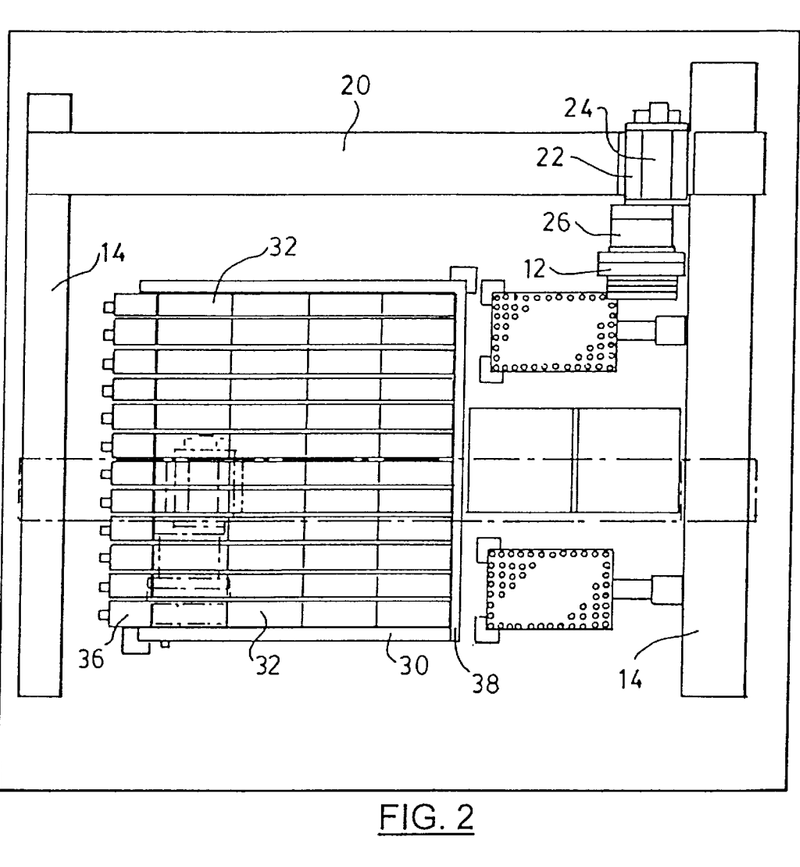
FIG. 2 is a plan view of the dispensing apparatus showing in phantom an alternate position of the dispensing head at a position remote from the home position.

Referring to FIGS. 1 and 2, the gene array dispensing apparatus or high precision dispensing apparatus of the present invention is shown generally at 10. The dispensing apparatus 10 controls movement of the dispensing head 12 in the X-axis, the Y-axis and the Z-axis.

The dispensing head 12 is supported in the X-axis on a fixed pair of parallel X guideways 14. The base of each X guideway 14 is supported on two side pillars 16 and a central pillar 18. Each pillar is the same height. Each central pillar 18 effectively reduces any deflection due to camber effect in each X guideway 14.

The dispensing apparatus is supported in the Y-axis along a movable Y guideway 20. The Y guideway 20 is moveably attached to the pair of X guideways 14.

The dispensing apparatus is supported in the Z-axis along a Z arm 22. Z arm 22 has a guideway portion 24 and a traveling portion 26. The guideway portion 24 is moveably attached to the Y guideway 20 and is moveable in the Y direction. The traveling portion 26 is moveably attached to the guideway portion 24 and is moveable in the Z direction.

In the apparatus shown herein the dispensing apparatus 10 is provided with an X linear actuator, a Y linear actuator and a Z linear actuator to move the dispensing head 12 relative to the platen 30. It will be appreciated by those skilled in the art that alternatively, the platen could be moved relative to the dispensing head. That is the platen could be moved in the X direction and the dispensing head in the Y and Z directions; or the platen could be moved in the X and Y directions and the dispensing head in the Z direction; or the platen could be moved in the X, Y and Z directions relative to the dispensing head.

Preferably a ball screw and motor with zero backlash coupling connection is made between the Y guideway 20 and the X guideway 14; between the Z arm 22 and the Y guideway 20; and between the guideway portion 24 and the traveling portion 26 of the Z arm 22. The ball screw is a preloaded ball screw so as to minimize compliance since a preloaded ball screw has negative clearance between the re-circulating balls and the guiding groove.

Sensors are used to provide information with regard to the position of the dispenser head 12. Specifically, three optical measurement devices 28x, 28y and 28z are used on each axis to obtain positional feedback information. Optical measurement device 28 is accurate to the 0.00125 mm distance along each axis. This high resolution, in association with the apparatus as described above, results in a positional repeatability as close as ±0.005 mm. X axis sensor 28x is an optical measuring device that measures the turns of the ball screw on the connection between the X guideway 14 and the Y guideway 20. The Y axis sensor 28y is an optical measuring device that measures the turns of the ball screw on the connection between the Y guideway 20 and the vertical or Z arm 22. The Z axis sensor 28z is an optical measuring device that measures the turns of the ball screw on the connection between the travelling portion 26 and the guideway portion 24 of the Z arm.

Figure 3:
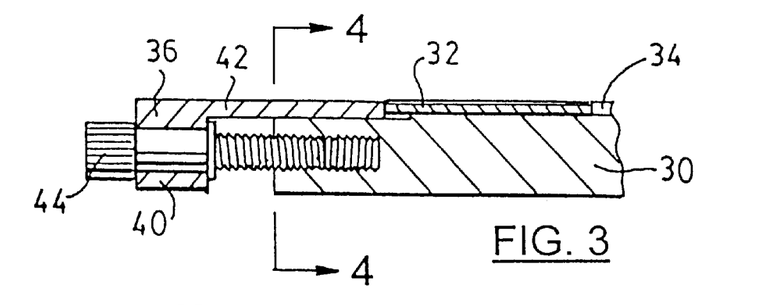
FIG. 3 is a partial sectional view taken along line 3—3 of FIG. 1 showing the slide clamp.
Figure 4:
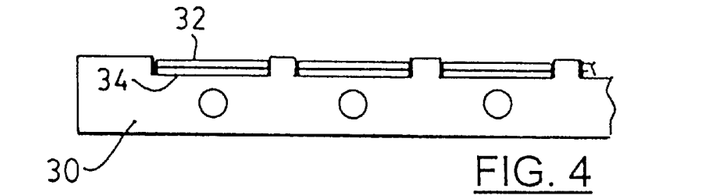
FIG. 4 is a partial sectional view taken along line 4—4 of FIG. 3 showing the grooves to hold the slides but with the clamps removed.
Figure 5:
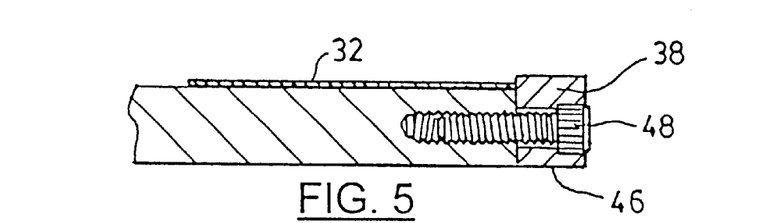
FIG. 5 is a partial sectional view taken along line 5—5 of FIG. 1 showing the slide end stopper.

The dispensing apparatus 10 includes a slide holder platen 30 for holding a plurality of slides 32. Slide holder platen 30 has a number of features that provide for flexibility and adjustability. As best seen in FIG. 4, the platen 30 has a plurality of channels 34 therein for receiving the slides 32. Each channel 34 has a slide clamp 36 shown in FIG. 3 and a slide end stopper 38 shown in FIG. 5. The slide clamp 36 has a vertical portion 40, a horizontal portion 42 and an adjustable screw connection 44. The horizontal portion 42 slides along channel 34. Slide end stopper 38 includes a vertical portion 46 and an adjustable screw connection 48. The slide clamp 36 and end stopper 38 allow the user to accommodate variations in the lengths and numbers of the slides 32.

The dispensing apparatus 10 includes at least one source plate 50. However preferably there are two source plates 50 so that when the material from one source plate is being deposited onto the slides the other source plate may be replaced. Accordingly, when all samples from the first source plate 50 have been deposited apparatus 10 will automatically start obtaining samples from the second source plate 50 and thus there will be no interruption in the process of depositing samples onto the slides 32. The dispensing apparatus 10 of the present invention may be adapted to accommodate variations in the number of rows of wells, number of columns of wells, and number of wells in each source plate 50.

Figure 6:
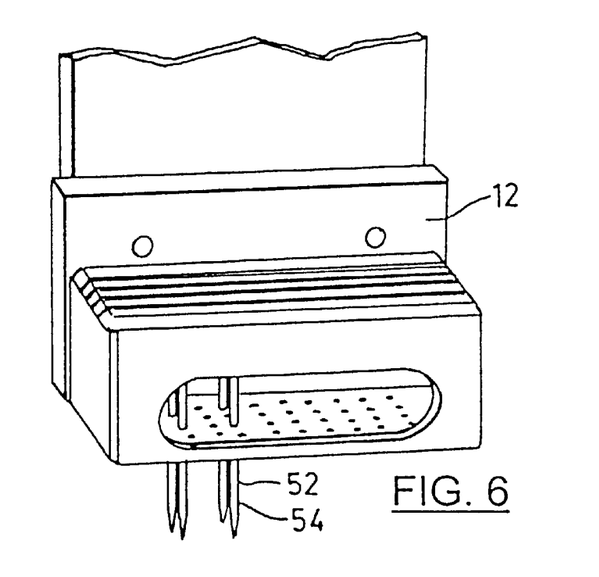
FIG. 6 is an enlarged perspective view of the dispensing head showing only four capillary pins positioned therein.

Dispensing head 12 shown in FIG. 6 could hold one or a plurality of dispensers 52. There are a number of different types of dispensers 52 that may be used. Specifically, capillary pins 54, adjustable capillary channel 56, capillary tube 58 or a capillary reel dispenser 60 (as shown in FIGS. 7, 9, 10 and 12 respectively). Note that each dispenser has advantages and disadvantages.

Figure 7:
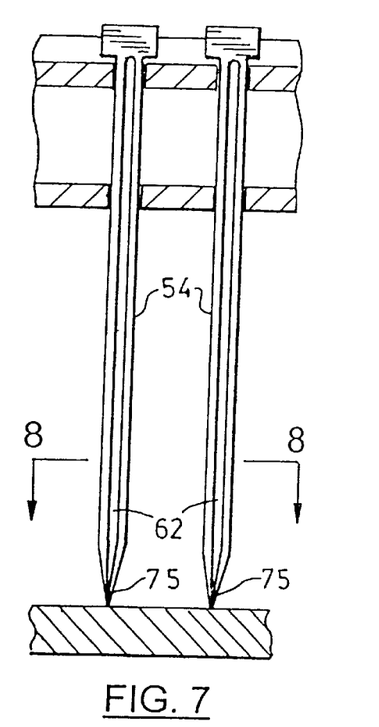
FIG. 7 is an enlarged partial sectional view similar to FIG. 6 but showing the capillary pins bearing down upon a slide.
Figure 8:
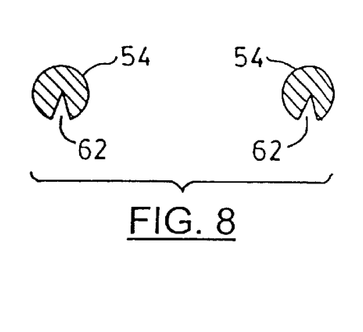
FIG. 8 is an enlarged partial sectional view of the two capillary pins of FIG. 7 showing the capillary groove.

Capillary pins 54 are shown in FIGS. 7 and 8. These type of dispensing heads are generally available in the market and an example of one is sold under the name Arraylt™. A groove 62 is formed therein for receiving the sample in the wells of the source plate 50. These type of dispensers are the type currently used in the prior art and can be used in the dispensing apparatus herein. A smaller groove 62 gives smaller samples, however, it tends to be less reliable with more chances of missed samples. Further cleaning capillary pin 54 is also problematic due to drying or sticking of samples on walls of the groove 62 and blockage by any sediment particulate.

The dispenser 52 is held in the dispenser head 12 with a friction fit such that under pressure the dispenser will move upwardly as shown in FIG. 7. Thus where there are variations in the height of the slide the dispenser 52 will move up so as not to damage the dispenser 52.

Figure 9:
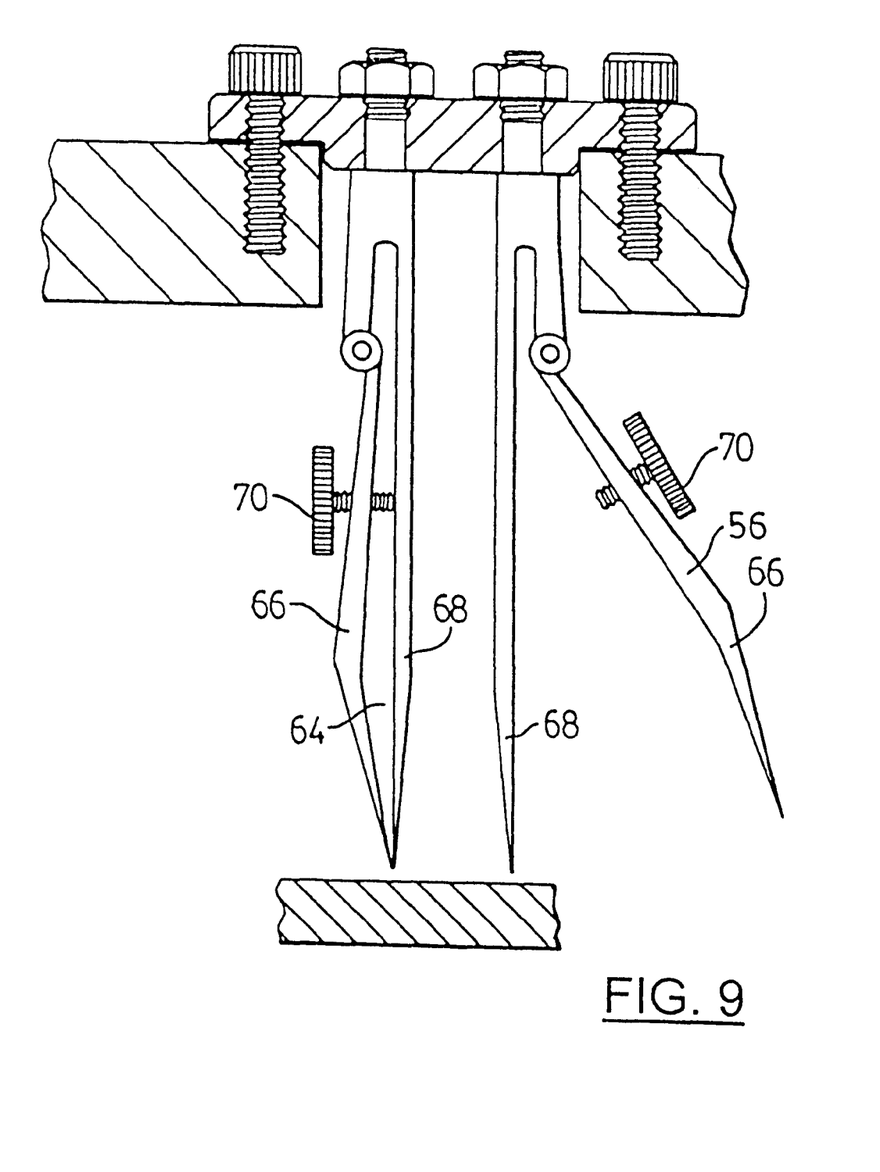
FIG. 9 is an enlarged cross sectional view of an alternate embodiment of a dispenser, namely an adjustable capillary pin.

Alternatively adjustable capillary channel 56 shown in FIG. 9 may be used. Adjustable capillary channel 56 is similar to a drafting type pen. The size of channel 64 is adaptable by changing the position of movable channel wall 66 relative to fixed channel wall 68. Screw 70 adjusts the relative distance between walls 66 and 68.

Figure 10:
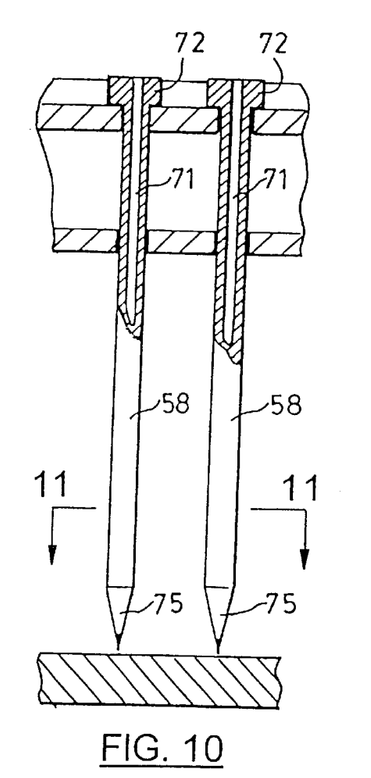
FIG. 10 is a partially broken away enlarged partial sectional view of an alternate embodiment of dispensers, namely a capillary tube.
Figure 11:
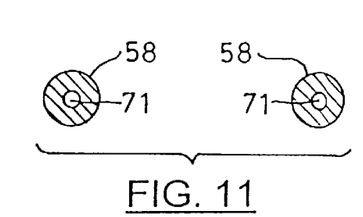
FIG. 11 is an enlarged partial sectional view of the two capillary pins of FIG. 10.

As a further alternative, a capillary tube 58, as shown in FIGS. 10 and 11, can be used in the dispenser head 12. The capillary tube 58 has a central hole 71 there through with a top end 72 which is open and an electro-pneumatic control circuit is attached thereto (not shown). By selectively controlling the air pressure in the capillary the shape of the surface tension of the sample can be controlled. Thus, the usually concave liquid sample surface is made slightly convex ensuring positive and even deposition of a sample with minimum impact between the fragile dispenser capillary tube 58 and the glass slide 32. Further, when the sample is to be collected by the capillary action of the capillary tube 58 in a well of the source plate 50, there could be air venting to achieve zero or negative pressure as compared to atmospheric pressure. It has been shown that the capillary tubes 58 with precise control of pressure achieve samples as small as 75 microns.

The top end 72 of the capillary tube 58 is connected to an electro-pneumatic pressure controller circuit for two different states of pressure, namely, no or negative pressure state, and low pressure state. The no pressure state ensures open venting to allow capillary raise of liquid inside the tube. The low pressure state is used in the capillary tube to control the shape of the surface tension film at the tip 75 of capillary tube 58. In the low pressure state, the shape of the film can be made convex projecting out of the tube, which otherwise is concave and thus inside the tube. The convex projection allows for easy and reliable spotting of the sample on slide 32.

Figure 12:
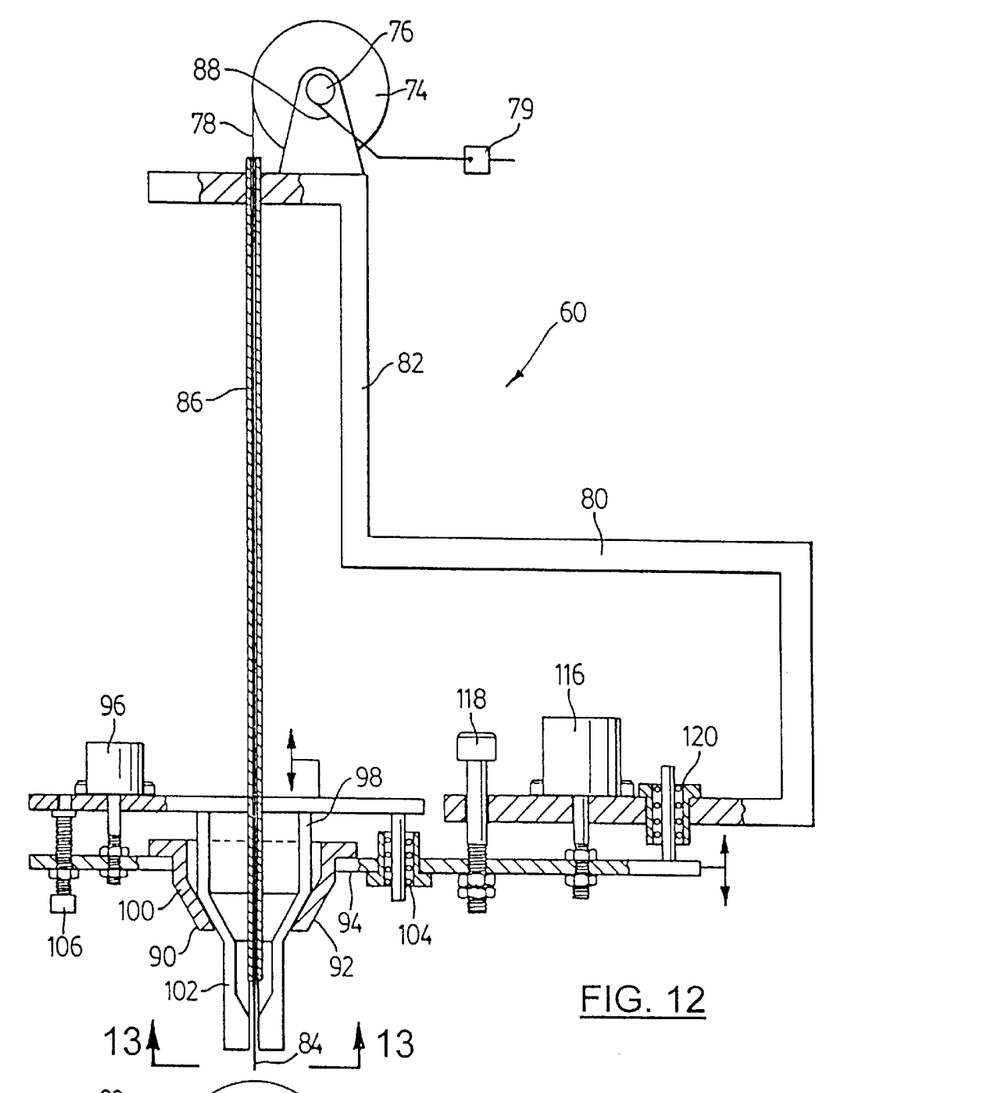
FIG. 12 is a front view of an alternate dispenser, namely a capillary reel dispenser.
Figure 13:
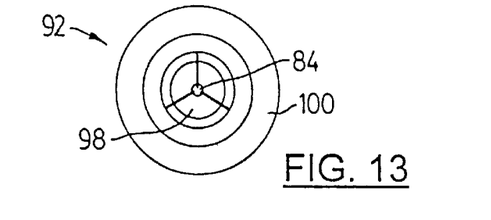
FIG. 13 is a bottom view of the bottom portion of the capillary reel dispenser of FIG. 12.

As a still further alternative, a silica capillary reel dispenser 60 could be used as shown in FIGS. 12 and 13. A capillary tube reel 74 is mounted on a reel axle 76. Elongate capillary tube 78 has an inner diameter as small as 0.050 mm and is capable of producing a capillary action. Elongate capillary tube 78 is made from silica and is similar to the silica tubes used for fibre optic cables. The reel has a passive one way torque ratcheting whereby when the tube is pulled from one end, a defined length of tube gets extracted. When the grip on that end is released, elongate tube 78 will remain in the same position at which it was released. The reel axle 76 is secured on a base 80 by a bracket 82. The distal end 84 of elongate tube 78 is pulled or advanced cyclically and is passed through a support tube 86. Similar to the above with regard to the capillary tube 58, the inner end 88 of elongate tube 78 is connected to an electro-pneumatic pressure controller circuit 79 for two different states of pressure, namely, no or negative pressure state, and low pressure state.

Feeder mechanism 90 is used to feed the elongate tube 78 into support tube 86. The bottom portion 92 of the feeder mechanism 90 consists of two main parts. One part to grip and release the elongate tube 78 and the other part to pull down the elongate tube 78. Both parts are mounted on a common mounting plate 94. Actuation of grip pneumatic cylinder or actuator 96 results in squeezing or release of the gripper 98 against cup 100. The gripper 98 is made of spring steel. Squeezing of the gripper 98 results in grasping of the capillary tube by the gripper jaws 102, and the release results in de-grasping. A pair of ball bushes 104 are used to guide the vertical relative motion between the cup 100 and gripper 98. The adjustment screw 106 ensures proper positioning of the end of stroke so that the grasp is just appropriate to lightly hold the elongate capillary tube 78. This avoids damage to the tube by excessive grasping force.

After a sample is spotted on all the slides 32 with the gripper 98 in a grasped condition, the contaminated part of elongate tube 78 is cut off by a stationary cutting knife (not shown). The lateral motion of the dispensing head 12 is used for the cutting process. After cutting and discarding the contaminated piece, the gripper 98 is opened as explained above. A second pneumatic cylinder of actuator 116 is actuated to move the gripper jaws 102 vertically to an upward position defined by a vertical adjustable screw 118. The vertical motion is guided by a second pair of ball bushes 120. The gripper jaws 102 are closed in this new position to re-grasp the elongate capillary tube 78. The second pneumatic cylinder or actuator 116 is now used again to move the gripper 98 downwards to the bottom position, pulling the elongate capillary tube 78 from the silica tube reel 74. The mechanism is now ready to be loaded with a new sample to repeat the cycle. Accordingly with this embodiment, any problems associated with cleaning or contamination of the dispensing device are overcome since a new end of the elongate capillary tube 78 is used with each new sample.

A cleaning well 122 (shown in FIG. 1) is positioned between the source plates. Once the spotting is completed the dispensers 52 are cleaned in the cleaning well 122. Preferably the dispensers 52 are dipped into the cleaning well a plurality of times to ensure that there is no contamination by dipping the dispensers thereafter into the wells of the source plate 50.

Figure 14:
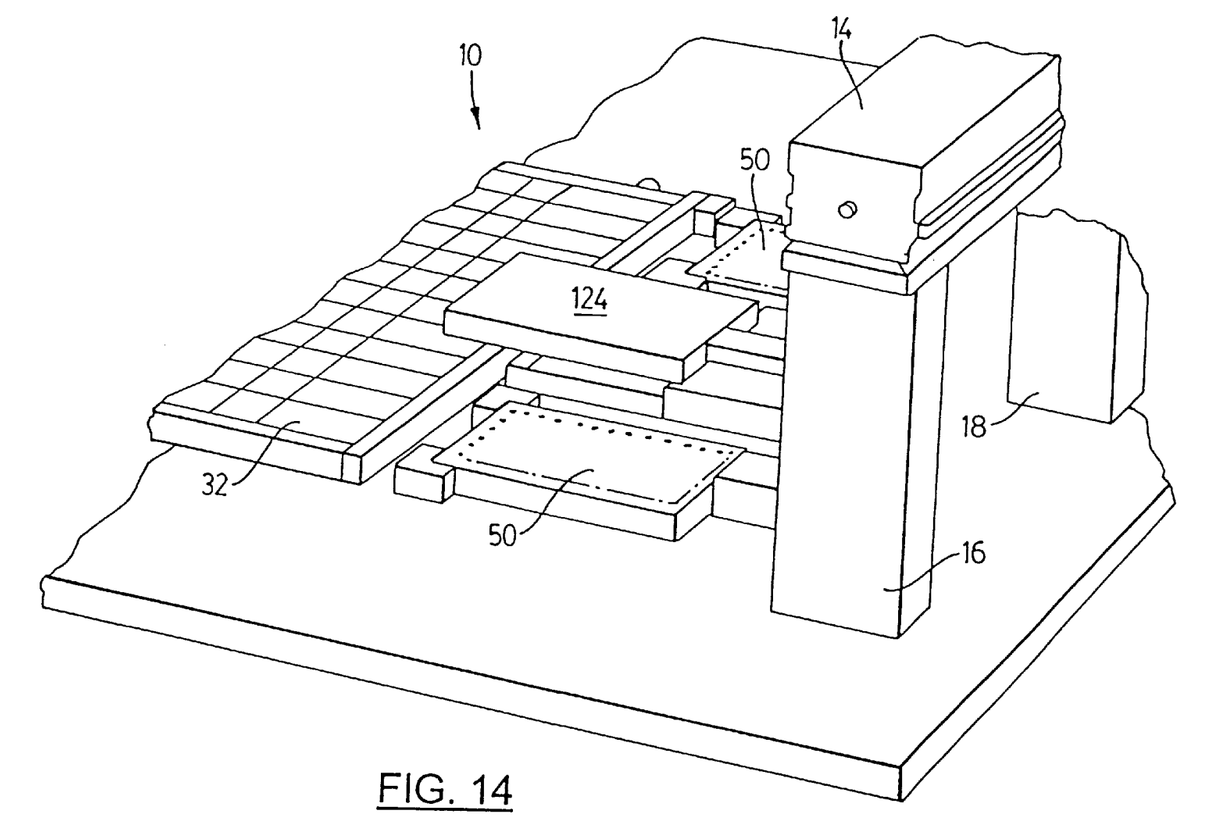
FIG. 14 is a partial perspective view of an alternate embodiment of the dispensing apparatus of the present invention including a well sample level measurement mechanism.

Note that the amount of liquid held in each dispenser 52 influences the sample size. Accordingly, the amount of the sample for each dip of dispenser 52 into a well of a source plate 50 should be the same. Levels of samples are different in different wells of the source plate 50, and a well sample level measurement mechanism 124, shown in FIG. 14, is attached to the frame. The well sample level measurement mechanism 124 may be an electrical conductivity mechanism. The electrical conductivity based mechanism relies on passage of current between the two mutually insulated portions of a dispenser 52 through the DNA liquid as soon as the tips of the insulated portions contact the DNA. Once the mechanism detects electrical current through the DNA the position of the dispenser therebelow will be a predetermined distance. The reliability of the electrical conductivity mechanism will depend on the conductivity of the DNA liquid; the response time within which the dispensing apparatus 10 can stop further dispenser dip into the DNA after the initial conduction; and consistency of the length of overshoot.

Capillary tube 58 and capillary reel dispenser 60 can be adaptively controlled in real time to adjust the level of the sample in each tube. Each dispenser is adaptively controlled by controlling the pressure inside the tube 58 or tube 78.

It is important to control the impact between dispenser 52 and the glass slide 32. Impact is required to break the surface tension in the concave liquid film held by the dispenser. A hard tap makes a large sample and could damage the coating on the glass slide. Variation in the level of slide holder platen 30, waviness on slide 32, variation in thickness of the slide and variations in the coating on the slide affect the level of the surface of the slide and in turn may affect the magnitude of impact between the dispenser 52 and the slide 32.

The variations in the level of slide holder platen is compensated in software. A calibration data array is obtained for a slide holder platen by measuring the Z-coordinates of each slide location (slide centre point) with respect to a reference level. The reference level corresponds to Z=0 coordinate. The optical encoder on the Z-axis is used to determine the distance between the point Z=0, and the platen surface along the Z-axis for each slide. The variation in distance is typically in the range up to 0.1 mm. Based on such calibration procedure, an array of variations is obtained and stored into the controller's permanent memory. The array is used in real-time operation of the machine to compensate for variation in the slide holder platen. Preferably the optical encoders that are used are accurate up to 0.00125 mm.

Using impedance control along the Z-axis compensates for the variation in the thickness of slides and other factors that influence the uniformity of dots. As a result, the Z-axis behaves as a "spring-mass-damper" system which when properly tuned can produce nearly identical impact between the dispenser and the glass slides independently of the thickness of the slides. A control system for the X and Y directions uses a position control system with different velocity and acceleration profiles.

Figure 15:
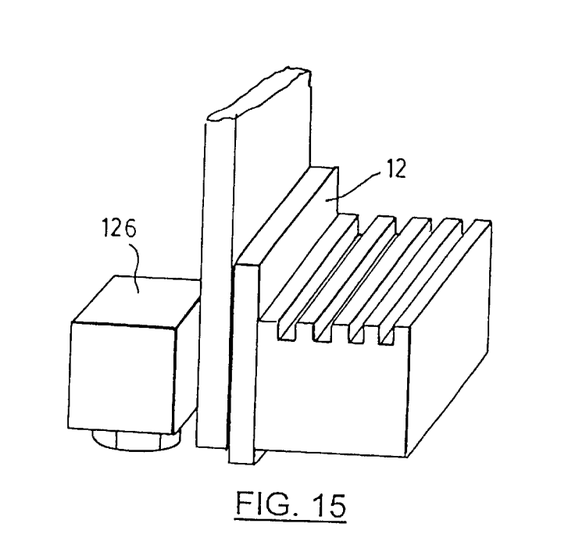
FIG. 15 is an enlarged view of a dispenser head shown with a microscopic video camera attached thereto.

Referring to FIG. 15, the high precision dispensing apparatus 10 includes a microscopic video camera based vision system which provides for image recognition of samples and thus on-line automatic inspection of the quality of samples. The quality of images obtained by microscopic video camera 126 depends on the concentration of the sample and establishment of the required non-interfering additives to improve the visibility of images.

Where the microscopic video camera based vision system detects a missed sample the system may include an interrupt mode to allow operator to repair the missed sample. In the program interrupt mode, an operator may pause a running program temporarily and then execute a repair or re-spotting of one or more samples, and then return or restore the machine to the original program run.

Figure 16:
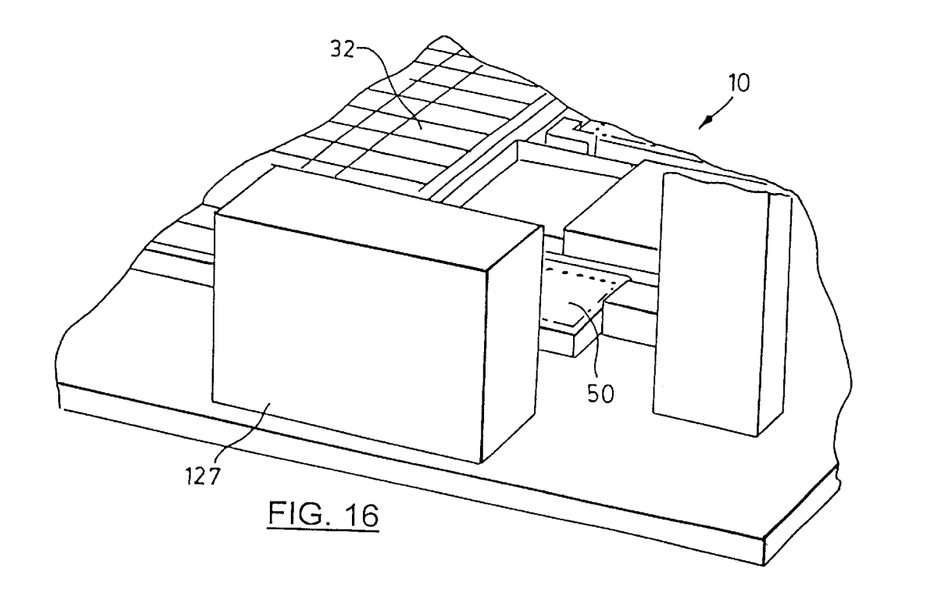
FIG. 16 is a partial perspective view of an alternate embodiment of the dispensing apparatus of the present invention including a source plate changer tower.

Referring to FIG. 16 dispensing apparatus 10 could be modified by including a source plate changer tower 127. Source plate changer tower 127 holds a plurality of source plates 50 and includes a mechanism for removing and replacing a source plate once the material therein has been deposited onto a slide 32. It will be appreciated by those skilled in the art that there are a number of different mechanism that could be used to change the source plates.

SOFTWARE

Figure 17:
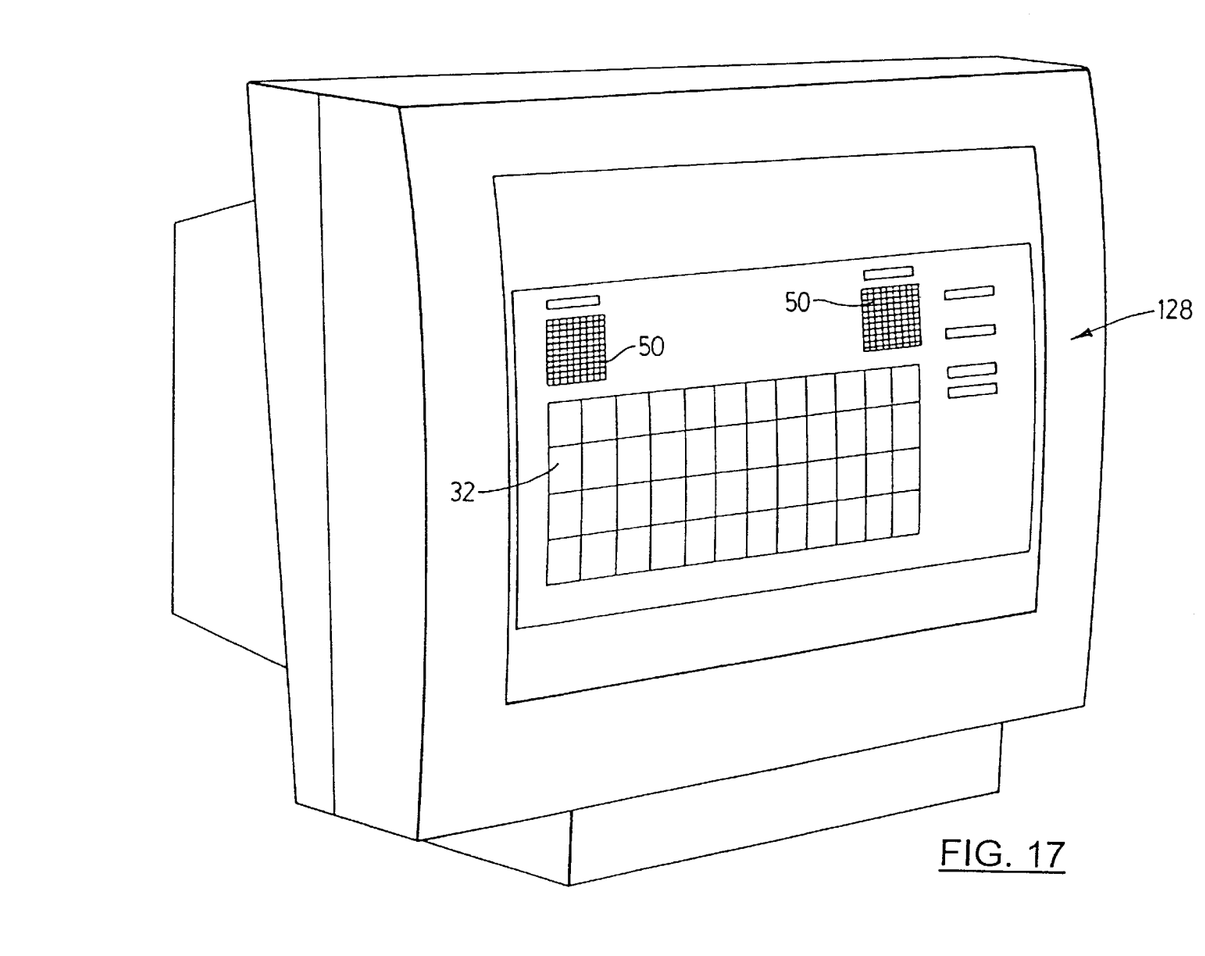
FIG. 17 is a perspective view of a computer monitor which is connected to the dispensing apparatus of the present invention, showing the display of a representation of the platen, slide layout and two source plates.

Referring to FIG. 17, a computer monitor 128 is operably connected to high precision dispensing apparatus. A Windows based user-friendly software interface is used to easily define on the computer monitor screen an array pattern to be spotted by the cell, and to choose any sample in the pattern that has to be inspected and/or repaired. The two source plates 50 and the slides 32 are represented on the computer monitor 128. A cursor moves from slide to slide as the samples are spotted on the slides. Samples are indicated by coloured spots made on the animated screen slides as the corresponding samples are made on the real slides. The wells that are already serviced on the source plates are indicated by change in colour of the animated wells on screen.

Figure 18:
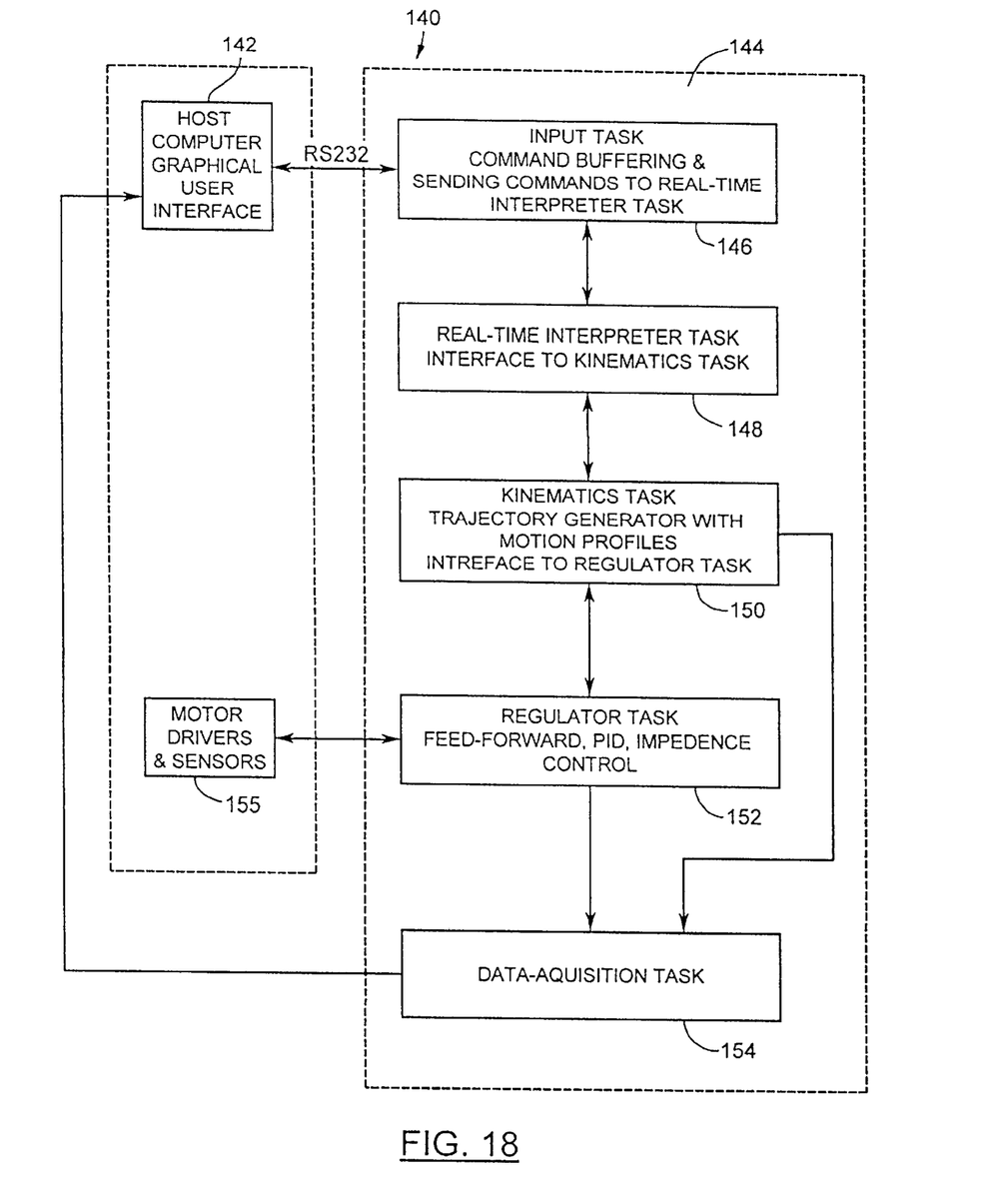
FIG. 18 is a flow chart of the control system of the present invention for the high precision dispensing apparatus.

The control system for the high precision dispensing apparatus 10 is shown generally at 140 in FIG. 18. A host computer 142 and an embedded computer 144 are used to realize the control system 140. The embedded computer 144 is located in the vicinity of the high precision dispensing apparatus 10, whereas the host computer may be remote from the high precision dispensing apparatus. A Graphical User Interface (GUI) allows the user to easily command and monitor the high precision dispensing apparatus. The GUI includes a command console which is used to issue a variety of commands to the machine, and a graphical window or monitor with a visual representation of slides, dots, etc. The progress of the machine can be monitored on the Graphical Window. User can create various programs using a specific programming language developed for the machine. Specific data on the position of some reference dots can be obtained by a teaching procedure. Teaching is realized via virtual joysticks on the User Interface Window. The virtual joystick is essentially digital and precise in navigation of the dispenser to a desired point. Once a program is developed, it has to be downloaded to the embedded computer via serial RS232 line, which connects these two computers.

A number of special commands are included in the control system. For example the palette-command is used to define a matrix of points and direction of motion along the points. The program can contain a large number of palettes. The speed and other parameters of motion can be changed between each two consecutive points using velocity, timing, and acceleration profile commands.

Another special command developed for the control system is the parameter tuning command. A system parameter can be changed anywhere in the program. This is primarily used in setting up high gains and, therefore, high positional accuracy in certain points of interest. For example, the position of the dispenser while moving towards a slide to leave a dot must be extremely precisely commanded so that the error does not exceed a micron or two. This is achieved by tuning the PID gains high before the dispenser starts moving towards the slide.

The embedded computer 144 is running in a multitasking mode. Each task has a triggering mechanism and an assigned priority. For example, the Input Task module 146 has a high priority and is an event-driven task. A character received through the serial communication line causes the event. This task collects the characters in a buffer, checks validity of the message, and sends the message to the Real-time Interpreter task module 148 when the message is complete.

The Real-time Interpreter task module 148 decodes the message while the system is running (therefore, it is referred to as "real-time interpreter"). The interpreter instructs the Kinematics Task module 150 whenever a "move" command appears. It prepares motion parameters so that the Kinematics Task module 150 can efficiently develop the desired trajectory of the dispenser. The reliability of the Real-time Interpreter Task module 148 is high due to the fact that it has to process a reduced instruction set as compared to other robot or general-purpose languages.

The Real-time Interpreter Task module 148 is responsible for line-by-line decoding of a downloaded program and executing it. The program may contain labels, jumps, loops, etc. The Real-time Interpreter Task module 148 executes the program as the program flow defines it. For example, if there is a jump instruction, the interpreter will change the program counter to the address where the jump is made and continue execution from this instruction.

Kinematics Task module 150 is a timer-driven task activated each 10 ms. The number of motion profiles is extended as compared to robotic controllers to accommodate for velocity and acceleration control of the dispenser, as well as impedance control in contact with a slide. Kinematics Task module 150 implements parabolic, cosine-square, trapezoidal, square and other acceleration profiles.

Regulator task module 152 receives new set-point data from the Kinematics Task module 150 each 10 ms, and performs fine interpolation (each 1 ms) and control of the system. The control is realized by the use of velocity and acceleration feed-forward terms, and Proportional-Derivative-lntegral feedback terms. The gains are tuned on-line provided that such command is issued. The tuning accommodates for impedance control of the dispenser. The effect is that the dispenser can be controlled in X-Y direction in a position mode, while it can behave as a spring-mass-damper system in Z direction. User can easily set the parameters of such system in any desired direction. Typically, the gains are set high in X-Y direction to achieve 1 micron positional accuracy, while they are set differently in Z direction to achieve desired impedance properties.

In addition, regulator task module 152 receives data from the sensors 155 with regard to the position of the dispenser head in the X, Y and Z direction. The positional data from the sensor and the set point data from the kinematics task is used to determine the control parameters. The control parameters are then sent to the motors 155 to move the dispensing head in the X, Y and/or Z direction.

By allowing the user to control a number of parameters such as velocity it provides flexibility to the user of the control system. For example the User would typically set the global velocity to a low value (e.g., 10% of the maximum speed) and start the program. The User will not use any dispenser in the dispenser holder. The User will then observe how the high precision dispensing apparatus works to make sure that the points that were assigned in the teaching procedure are correct. The User would then press "cycle stop" button provided on the User Interface screen and place the dispensers in the dispenser block. The User would continue the program by pressing "cycle continue" button on the User Interface screen, and carefully observe whether the points are placed in the correct positions. If so, the User would again press "cycle stop" and increase the velocity to desired value (e.g. 100% of the maximum speed), and then press "cycle continue". The apparatus would then run at a maximum speed.

Further, by controlling the velocity and acceleration of the dispenser, the accuracy, reliability and cycle-time of the system can more readily be maximized. By precisely controlling the speed and acceleration when the dispenser is approaching the slide, as well as the time of contact, increased uniformity of the dots can be achieved. For example, when the dispenser is approaching a slide, it should decelerate smoothly to reach the contact. This is realized by the "cosine-square" acceleration profile. Similarly, when the dispenser has to leave the slide after applying a sample, it must accelerate quickly to prevent too much of sample to be left on the slide. This is realized by the "trapezoidal" acceleration profile.

The Data Acquisition Task module 154 is running in parallel to other tasks. The main purpose of this task is to acquire desired data and to send the data to the Host computer 142. A special feature of the implemented language is that there exists a Data-Acquisition Command which defines the variables to be acquired at desired time intervals. The processing of the acquired data can be done on-line while the machine is working. Based on the results, a user can tune the system on-line to achieve desired performance.

The language developed for the machine comprises a reduced set of instructions as compared to general-purpose programming languages or robot languages. By reducing the set of instructions the reliability of the control system is increased.

Many of the commands used in the control system herein are unique to this control system and are not found in prior art control systems associated with gene array manufacture. These commands allow for on-line tuning of the performance of the system (impedance, positional accuracy, etc.). Similarly, there is a set of data-acquisition commands, which are not supported in other systems. These additional commands are very important for monitoring the system performance and tuning of the parameters. There is also a powerful palette command that allows defining the task in a compact form while reducing the possibility for programming or system-execution errors. Different programs can share the same database of points.

The host computer is supplied with a standard set of programs. There is no need to go through the teaching procedure if a standard program is used. A standard program refers to a program that uses a given number of slides, a given number of dots on each slide, a given number of wells in source plates supplied with the machine, and a given type of dispensers supplied with the machine.

A user will typically use standard programs in the initial phase of using the machine. After the user becomes familiar with the control system and the user has specific tasks to accomplish with slides that are different than standard ones, or with dispensers that are different from standard one, or with source plates that are different from standard ones, the user will go through the teaching procedure.

The User selects a desired standard program from User Interface environment, and downloads the program to the embedded computer. After that, the user has to issue "run" command in order for machine to start executing the downloaded program.

During the "teaching procedure" the characteristic points are stored in a form of a program file. By the use of virtual joysticks the dispenser head and the dispenser attached thereto are moved. User can change the speed and direction of motion of each dispenser (X, Y and Z) by using the virtual joysticks. Once the dispenser endpoint is at desired location, user will issue "save" command and the corresponding X, Y, and Z coordinates will be stored as a point in the program file. The user also defines the name of this point. After "teaching" all characteristic points, user will issue "teaching completed" command and the points will be stored on the Host Computer hard drive as a program file. The program file is then downloaded and "run".

Characteristic points are for example XYZ coordinates of the first slide, XYZ coordinates of the first well on the left source plate, XYZ coordinates of the first well on the second source plate, etc.

The control system allows the User to change the parameters either in the program itself or interactively. To change the parameters interactively the User initiates a "cycle stop" command, and then change a parameter, and then issue "cycle continue" command. Alternatively any parameters can be changed in the program mode within a program file.

The system parameters includes the following:
Maximum velocity for X, Y and Z axes;
Maximum acceleration for X, Y and Z axes;
Limits for the coordinates X, Y and Z;
Position gain for X, Y and Z axes;
Derivative gain for X, Y and Z axes;
Integral gain for X, Y, and Z axes;
Feed-forward acceleration parameter for X, Y and Z axes; and
Feed-forward velocity parameter for X, Y and Z axes.

During tuning the following feedback and feed-forward gains may be changed:
Position gain for X, Y and Z axes;
Derivative gain for X, Y and Z axes;
Integral gain for X, Y, and Z axes;
Feed-forward acceleration parameter for X, Y and Z axes; and
Feed-forward velocity parameter for X, Y and Z axes.

The User can control the impedance (equivalent "stiffness" and "damping" parameter of the dispenser) by changing the feedback gains of the Z-axis. The position gain influences the stiffness of the dispenser in Z direction. (Higher gain, higher stiffness) Derivative gain influences the damping in Z direction. Impedance is important in the contact phase between the dispenser and the slide. The dispenser should behave as if mounted on a spring-mass-damper system so that the contact is not too hard, but not too soft either. A hard contact creates an impact, while a soft contact may last too long.

The high precision positioning device of the present invention including the apparatus and the software provides a number of advantages over the prior art. In particular the system as described above is repeatable in the range of 0.001 to 0.005 mm and it is accurate up to 0.005 mm. The positioning of the end effector in the high precision positioning device of the present invention is accurate to 200,000 spots per centimetre squared. However, with regard to the high precision device for use in the manufacture of gene arrays, the generally available dispensers similar to those shown in FIGS. 6, 7 and 8 spot a sample that is 0.08 mm in diameter. Accordingly the practical limitation for the high precision positioning device, for use in the manufacture of gene arrays, using the generally available dispensers, is 40,000 spots per centimetre squared which is considerably denser than the prior art systems which produce a density of 2,500 spots per centimetre squared. Accordingly, the high precision positioning device of the present invention can readily manufacture slides having gene arrays in a density of 20,000 to 40,000 spots per centimetre squared using the generally available dispensers.

It will be appreciated that the above description related to the present invention by way of example only. Many variations on the invention will be obvious to those skilled in the art and such obvious variations are within the scope of the invention as described herein whether or not expressly described.

What is claimed as the invention is:

1. A high precision positioning device comprising:
   an end effector;
   a platen spaced below the end effector for receiving a workpiece;
   a means for moving one of the end effector and the platen in the X-Y plane;
   a means for moving one of the end effector and the platen in the Z direction;

a sensing means for sensing the position of the end effector in the X, Y and Z direction; and a control system for controlling the movement of the end effector relative to the platen and adjusting the position of the end effector relative to the platen and the X, Y and Z position as sensed by the sensing means and wherein the control system includes an impedance control system that emulates a spring-mass-damper system for movement in the Z direction.

2. A high precision positioning device as claimed in claim 1 wherein the control system uses a position control system with different velocity and acceleration profiles for movement in the X and Y direction.

3. A high precision positioning device as claimed in claim 1 wherein the end effector is a capillary tube dispenser having a hole therein and a spotting end and an upper end and the upper end being connected to an electro-pneumatic control circuit for controlling the pressure in the capillary tube.

4. A high precision positioning device as claimed in claim 1 wherein the end effector is a dispensing head having a plurality of capillary tube dispensers each dispenser having a hole therein and a spotting end and an upper end and the upper end being connected to an electro-pneumatic control circuit for controlling the pressure in the capillary tube.

5. A high precision positioning device as claimed in claim 1 wherein the dispenser is a capillary reel dispenser including a capillary tube, a capillary reel having the capillary tube wound therearound, a means for advancing the capillary tube and a cutter for cutting off the used portion of the capillary tube.

6. A high precision positioning device as claimed in claim 1 wherein the end effector is a dispensing head including a plurality of capillary reel dispensers each dispenser including a capillary tube, a capillary reel having the capillary tube wound therearound, a means for advancing the capillary tube and a means for cutting off the used portion of the capillary tube.

7. A high precision positioning device as claimed in claim 1 wherein the platen is generally parallel to the X-Y plane and the Z direction is generally normal to the platen.

8. A high precision positioning device as claimed in claim 7 wherein the X-Y moving means includes an X linear actuator connected to one of the end effector and the platen for movement along the X axis and a Y linear actuator connected to one of the end effector and the platen for movement along the Y axis.

9. A high precision positioning device as claimed in claim 8 wherein the X linear actuator is moveably connected to the end effector.

10. A high precision positioning device as claimed in claim 9 wherein the Y linear actuator is moveably connected to X linear actuator and thereby connected to the end effector.

11. A high precision positioning device as claimed in claim 10 wherein the Z moving means is a vertical arm connected to end effector and moveably connected to the Y linear actuator.

12. A high precision positioning device as claimed in claim 11 wherein the X linear actuator includes an X guideway, a ball screw having effective zero backlash connecting the X guideway to the Y linear actuator and a motor operably connected to the ball screw.

13. A high precision positioning device as claimed in claim 12 wherein the Y linear actuator includes a Y guideway, a ball screw having effective zero backlash connecting the Y guideway to the vertical arm and a motor operably connected to the ball screw.

14. A high precision positioning device as claimed in claim 13 wherein the vertical arm includes a guideway portion, a traveling portion, a ball screw having effective zero backlash connecting the travelling portion to the guideway portion and a motor operably connected to the ball screw.

15. A high precision positioning device as claimed in claim 14 wherein the sensing means includes an X axis sensor connected to the X guideway for sensing the position of the end effector in the X direction; a Y axis sensor connected to the Y guideway for sensing the position of the end effector in the Y direction; and a Z axis sensor connected to the vertical arm for sensing the position of the end effector in the Z direction.

16. A high precision positioning device as claimed in claim 15 wherein the X axis sensor is an optical measuring device that measures the turns of the ball screw on the connection between the X guideway and the Y guideway, the Y axis sensor is an optical measuring device that measures the turns of the ball screw on the connection between the Y guideway and the vertical arm and the Z axis sensor is an optical measuring device that measures the turns of the ball screw on the connection between the travelling portion and the guideway portion of the vertical arm.

17. A high precision positioning device as claimed in claim 15 wherein the end effector is a dispensing head having at least one dispenser extending downwardly therefrom.

* * * * *